(12) United States Patent
Yajima et al.

(10) Patent No.: US 6,819,209 B2
(45) Date of Patent: Nov. 16, 2004

(54) MAGNETIC DAMPER AND ACTUATOR HAVING THE SAME

(75) Inventors: Hisashi Yajima, Tsukuba-gun (JP);
Nobuhiro Fujiwara, Tsukuba-gun (JP);
Satoru Ito, Tsukuba-gun (JP)

(73) Assignee: SMC Corporation, Tokyo (JP)

(*) Notice: Subject to any disclaimer, the term of this patent is extended or adjusted under 35 U.S.C. 154(b) by 0 days.

(21) Appl. No.: 10/691,693

(22) Filed: Oct. 24, 2003

(65) Prior Publication Data

US 2004/0090295 A1 May 13, 2004

(30) Foreign Application Priority Data

Nov. 7, 2002 (JP) ......................................... 2002-323806

(51) Int. Cl.[7] ................................................. H01F 7/08

(52) U.S. Cl. ........................ 335/257; 335/271; 335/277

(58) Field of Search ................................. 335/255, 257, 335/271, 277

(56) References Cited

U.S. PATENT DOCUMENTS 5,300,908 A * 4/1994 Stone et al. ................ 335/256

* cited by examiner

Primary Examiner—Ramon M. Barrera
(74) Attorney, Agent, or Firm—Oblon, Spivak, McClelland, Maier & Neustadt, P.C.

(57) ABSTRACT

A magnetic damper comprises a movable braking plate for receiving an operating element of an actuator, and a stator for attracting the braking plate by a magnetic force. A magnetic attraction force acting between the stator and the braking plate is used as a braking force for stopping the operating element.

19 Claims, 2 Drawing Sheets

MAGNETIC DAMPER AND ACTUATOR HAVING THE SAME

TECHNICAL FIELD

The present invention relates to a magnetic damper using a magnetic force as a braking force, and an actuator having the damper.

BACKGROUND ART

When an output shaft of an actuator is to be stopped at a stroke end, it is general to bring an operating element which is mounted on the shaft and moves together with the shaft into abutment against the damper. In this case, in order to moderate an impact at the time of abutment, various dampers are used.

As such a damper, there is a widely known damper which uses an elastic force of a spring or rubber as a braking force. In the case of this damper, the spring or rubber is compressed when the operating element collides and the elastic force is increased. Thus, the operating element largely bounces by the repulsion, and vibration is repeated until the operating element stops. Therefore, it takes time until the shaft stops at the stroke end, and there is a possibility that precise driving and control operations of the actuator are hindered. Further, since the spring or rubber is elastically deformed whenever the operating element collides, there is a problem that the spring or rubber is damaged while the operating element repeatedly collides and the elastic force is deteriorated, and the endurance is poor.

DISCLOSURE OF THE INVENTION

It is a technical object of the present invention to enhance service conditions and endurance of a damper which damps and stops an operating element of an actuator by reducing a bounce caused when the operating element collides, by shortening time required until the operating element stops, and by reducing damage caused by collision of the operating element.

To achieve the above object, the present invention provides a magnetic damper comprising a movable braking plate for receiving an operating element of an actuator, and a stator for attracting the braking plate by a magnetic force, wherein a magnetic attraction force acting between the stator and the braking plate is used as a braking force for stopping the operating element.

In the magnetic damper having the above-described structure, if the moving operating element collides against the braking plate at the stroke end, the braking plate is displaced in a direction apart from the stator, but since the magnetic attraction force is acting between the braking plate and the stator, the magnetic attraction force acts as a braking force and a kinetic energy of the operating element is absorbed, and the operating element is damped and stopped at the stroke end. At that time, by setting a mass of the braking plate to a large value to some extent, preferably to a value closer to that of the operating element as close as possible, a collision energy when the operating element collides can reliably and efficiently be absorbed by cooperation of the displacement of the braking plate and the magnetic attraction force.

The braking plate which once separated from the stator is pulled back by the magnetic attraction force between the stator and the braking plate, and the braking plate stops at that position together with the operating element.

In the magnetic damper, since the magnetic attraction force between the braking plate and the stator is used as the braking force, a bounce of he operating element is smaller than that of the conventional damper using elastic force of a spring or rubber, and the operating element can be stopped earlier within a short time. Even if the operating element repeatedly collides against the braking plate, neither the magnetic force nor the braking force is deteriorated and endurance is excellent.

In the present invention, the operating element and braking plate maybe able to adsorb each other by a magnetic force. With this, a bounce between the operating element and the braking plate can be suppressed and the operating element can stop in a shorter time.

In this invention, a buffering member may be disposed on an abutment surface of the braking plate with respect to the operating element. With this, it is possible to moderate an impact caused when the operating element collides against the braking plate, and to prevent an impact noise from being generated.

The present invention also provides an actuator having the above-described magnetic damper, in which an operating element that moves together with a member which takes out an output is damped and stopped at the stroke end by the magnetic damper.

In the invention, the actuator may comprise cylindrical yokes having a pair of opposed polar teeth, an exciting coil wound around the yokes, an operating element having a cylindrical permanent magnet which is axially movably disposed in hollow portions of the yokes and which is provided with north pole and south pole polarized in its radial direction, and an output shaft connected to the operating element.

According to a concrete example of the invention, the braking plate is formed into an annular shape and disposed on side surfaces of the yokes such that the braking plate adsorbs the side surfaces, and the shaft passes through the braking plate.

BEST MODE FOR CARRYING OUT THE INVENTION

Figure 1:
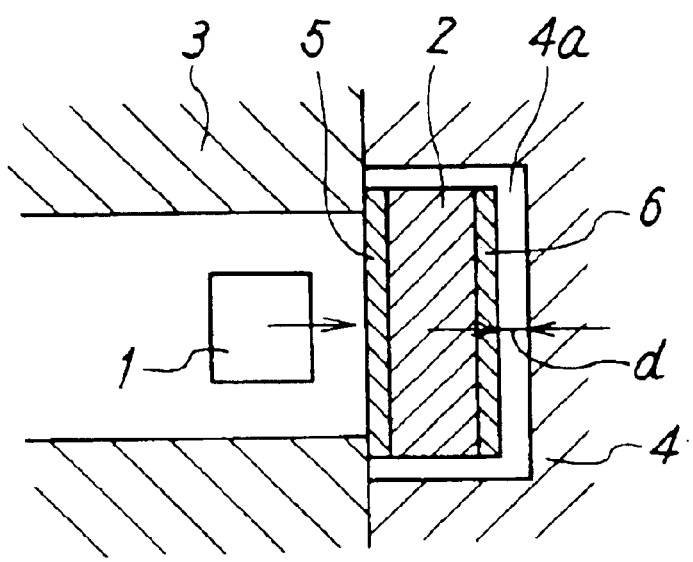
FIG. 1 is a sectional view showing, in principle, a structure of a magnetic damper according to the present invention.

FIG. 1 shows, in principle, a structure of a magnetic damper according to the present invention. The magnetic damper includes a movable braking plate 2 which receives an operating element 1 of an actuator, and a stator 3 which attracts the braking plate 2 by means of a magnetic force. The magnetic damper uses a magnetic attraction force acting between the stator 3 and the braking plate 2 as a braking force for stopping the operating element 1.

The stator is 3 comprised of a permanent magnet or electromagnet, and has a space therein. The operating element 1 moves in the space.

The braking plate 2 is made of magnetic material (including permanent magnet) such as iron, nickel and magnetic rubber, and is formed into a required shape such as circular shape and rectangular shape. The braking plate 2 is accommodated in a braking chamber 4a formed in an end of the space in the stator 3, and attracted magnetically on a side surface of the stator 3. The braking chamber 4a is formed in a cover member 4 made of nonmagnetic material connected to the side surface of the stator 3, and has such a space that the braking plate 2 can separate from the stator 3 and can move by a distance d to some extent. The distance d through which the braking plate 2 can move is set within a range in which the magnetic attraction force acts between the braking plate 2 and the stator 3. In other words, even if the braking plate 2 once separates from the stator 3 and moves by the distance d, a sufficient magnetic attraction force is acted on the braking plate 2 from the stator 3 and the braking plate 2 is again attracted by the stator 3 by means of the magnetic attraction force and returns to its original position.

Buffering members 5 and 6 made of elastic material such as rubber and sponge are mounted, through means such as adhesive, on both front and back surfaces of the braking plate 2, i.e., a first surface against which the operating element 1 abuts and a second surface on the opposite side therefrom against which a deep surface of the braking chamber 4a abuts. The buffering members 5 and 6 moderate impact caused by collision between the braking plate 2 and the operating element 1 and collision between the braking plate 2 and the deep surface of the braking chamber 4a, and prevents impact noise from being generated.

In the illustrated example, the buffering member 5 is mounted to the entire first surface of the braking plate 2 so that the braking plate 2 is attracted by the stator 3 through the buffering member 5, but the buffering member 5 may be removed from an outer peripheral portion of the first surface, i.e., a portion which comes into contact with the stator 3 so that the braking plate 2 may directly come into contact with the stator 3 and may be attracted by the stator 3.

In the magnetic damper having the above-described structure, if the operating element 1 which moves by a signal operation or the like collides against the braking plate 2 at the stroke end, the braking plate 2 is displaced in a direction apart from the stator 3, but since the magnetic attraction force acts between the braking plate 2 and the stator 3, this magnetic attraction being a braking force, a kinetic energy of the operating element 1 is absorbed and the operating element 1 is damped and stopped at the stroke end. At that time, by setting a mass of the braking plate 2 to a large value to some extent, preferably by setting the mass of the braking plate 2 to a value closer to that of the operating element 1 as close as possible, a collision energy when the operating element 1 collides can reliably and efficiently be absorbed by cooperation of the displacement of the braking plate 2 and the magnetic attraction force.

The braking plate 2 which once separated from the stator 3 is pulled back by the magnetic attraction force between the stator 3 and the braking plate 2 and is attracted by the stator 3, and stops at that position together with the operating element 1.

The operating element 1 may be made of magnetic material, nonmagnetic material or a combination thereof. If the operating element 1 is made of magnetic material (including permanent magnet and electromagnet), when the operating element 1 collides against the braking plate 2, the operating element 1 is attracted by the braking plate 2 which is made of permanent magnet or is magnetized by the magnetic force of the stator 3, and the operating element 1 and the braking plate 2 moves integrally. Therefore, the operating element 1 and the braking plate 2 do not repel or vibrate at the time of collision, and the time required until the operating element 1 stops is short.

When the operating element 1 is made of nonmagnetic material, the operating element 1 is not absorbed by the braking plate 2 even if the operating element 1 collides against the braking plate 2, but since the kinetic energy of the operating element 1 is absorbed by the cooperation of the displacement of the braking plate 2 and the magnetic attraction force, the operating element 1 does not repel and repeat vibrating, and the time required until the operating element 1 stops is short as compared with a conventional spring-type damper.

Further, since the buffering members 5 and 6 are disposed on the front and back surfaces of the braking plate 2, an impact caused when the operating element 1 collides against the braking plate 2 and an impact caused when the braking plate 2 abuts against the deep surface of the braking chamber are moderated, and an impact noise is less likely to generate. Even if the operating element 1 collides against the braking plate 2 through the buffering member, since the braking plate 2 is displaced as mentioned above and the collision energy is reduced, the buffering member is not largely compressed and the operating element 1 does not largely bounce.

In the magnetic damper, since the magnetic attraction force between the braking plate 2 and the stator 3 is used as the braking force, a bounce of the operating element 1 is smaller than that of the conventional damper using elastic force of a spring or rubber, and the operating element 1 can be stopped within a short time. Even if the operating element 1 repeatedly collides against the braking plate 2, the magnetic force nor the braking force is deteriorated and endurance is excellent.

Although the buffering members 5 and 6 are disposed on both surfaces of the braking plate 2 in the illustrated embodiment, it is not always necessary to provide both the buffering members 5 and 6. Only the first surface against which the operating element 1 abuts or only the second surface on the opposite side may be provided with a buffering member.

Figure 2:
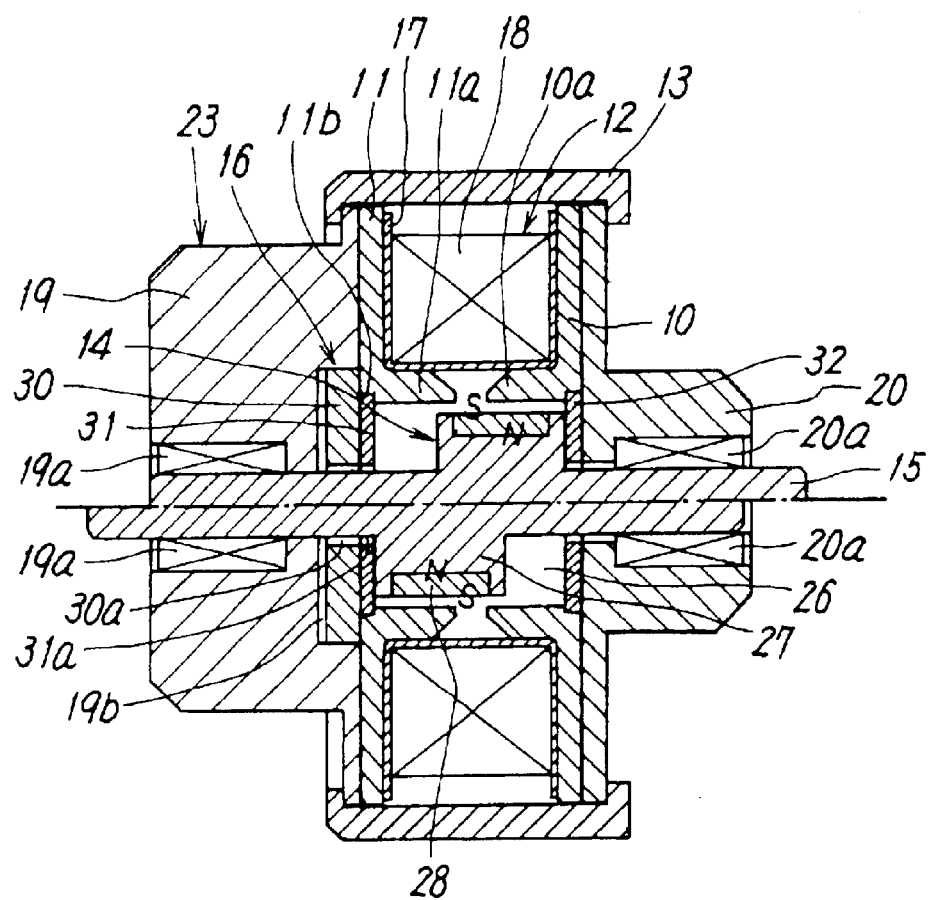
FIG. 2 is a sectional view of an essential portion of an embodiment of an actuator using the magnetic damper of the invention.

FIG. 2 shows one embodiment of an actuator having the above-described magnetic damper. This actuator is a magnetically movable type electromagnetic actuator. In this actuator, an operating element having a permanent magnet is electromagnetically moved to move an output shaft.

The actuator comprises first and second magnetic inner yokes 10 and 11 having cylindrical polar teeth 10a and 11a which are opposed to each other at a distance in the axial direction, an exciting coil 12 disposed around the polar teeth 10a and 11a of the inner yokes 10 and 11, a cylindrical magnetic outer yoke 13 which surrounds outer peripheries of the inner yokes 10 and 11 and the exciting coil 12, an operating element 14 which is axially movably disposed in hollow portions of the polar teeth 10a and 11a, an output shaft 15 connected to the operating element 14, and the magnetic damper 16 which damps and stops the operating element 14 at the stroke end.

The exciting coil 12 is formed into an annular shape by winding a winding 18 around a bobbin 17. The polar teeth 10a and 11a of the inner yokes 10 and 11 are fitted in a hollow portion of the bobbin 17.

A nonmagnetic cover 19 is mounted on a side surface of an axial direction of the inner yokes 10 and 11, and a nonmagnetic cap 20 is mounted on the other surfaces of the inner yokes 10 and 11. The cover 19, the cap 20 and the outer yoke 13 constitute a casing 23. Opposite ends of the shaft 15 pass through the cover 19 and the cap 20 and extends outside, and is axially slidably supported by bearings 19a and 20a.

An operating element chamber 26 is formed in the casing 23. An outer periphery of the operating element chamber 26 is surrounded by the pair of polar teeth 10a and 11a. The operating element 14 is disposed in the operating element chamber 26. The operating element 14 includes a nonmagnetic magnet holder 27 which is integrally formed on the shaft 15, and a permanent magnet 28 held by the magnet holder 27.

The permanent magnet 28 is formed into a cylindrical shape as a whole, and has north pole and south pole polarized in its radial direction. In the illustrated example, the permanent magnet 28 is provided at its outer periphery polarized with the south pole and at its inner periphery with the north pole. The permanent magnet 28 has a length extending between the pair of polar teeth 10a and 11a, and even when the operating element 14 reaches the stroke end, a portion of the permanent magnet 28 is superposed on or in vicinity of the polar teeth 10a and 11a.

The magnetic damper 16 is provided on the side of the cover 19, and has basically the same structure and effect as that shown in FIG. 1. That is, the damper 16 has a movable braking plate 30 for receiving the operating element 14, and a stator which attracts the braking plate 30 by the magnetic force. The second inner yoke 11 functions as the stator.

The braking plate 30 is formed into an annular shape, and is accommodated in a braking chamber 19b which is formed in an inner surface of the cover 19. The shaft 15 passes through a hollow portion 30a in the braking plate 30. A buffering member 31 for moderating an impact at the time of collision against the operating element 14 is mounted on a first surface of inner side of the braking plate 30. The buffering member 31 is formed into a disk-like shape having a diameter smaller than that of the braking plate 30. A peripheral edge of the buffering member 31 is fitted into a step 11b provided in the second inner yoke 11. The buffering member 31 is provided at its central portion with a hole 31a through which the shaft 15 passes so that the shaft 15 is not prevented from sliding in the axial direction. No buffering member is mounted on a second surface of the outer side of the braking plate 30.

An end of the operating element chamber 26 on the side of the cap 20 is provided with a buffering member 32 which is similar to the buffering member 31. The buffering member 32 moderates an impact caused when the operating element 14 returns.

In the actuator 2 having the above-described structure, if the exciting coil 12 is energized and current flows in such a direction that the second pole teeth 11a become north pole and the other first pole teeth 10a become south pole in a state in which the shaft 15 is in its retreated end as shown in an upper half in FIG. 2, an attraction force is acted between the north pole generated in the second pole teeth 11a and the south pole on the outer periphery side of the permanent magnet 28, and a repulsion acts between the south pole generated in the first polar teeth 10a and the south pole of the permanent magnet 28. Therefore, these forces act as axial thrust on the operating element 14 and thus, the operating element 14 advances together with the shaft 15 as shown in lower half in FIG. 2.

The operating element 14 collides against the braking plate 30 at the advancing stroke end, the damper 16 is operated, and the operating element 14 and the shaft 15 are damped and stopped at the stroke end. The effect of the damper 16 at that time is substantially the same as that shown in FIG. 1 and thus, detailed explanation is omitted here to avoid overlaps.

If the current flows to the exciting coil 12 in a direction opposite from the above case in a state in which the shaft 15 is in the advancing stroke end shown in the lower half of FIG. 2, the first polar teeth 10a become north pole and the second polar teeth 11a become the south pole. Therefore, the permanent magnet 28, i.e., the operating element 14 is attracted toward the first polar teeth 10a and is retreated together with the shaft 15 to the position shown in the upper half of FIG. 2.

This actuator is a magnetically movable electromagnetic actuator, but an actuator to which the magnetic damper can be applied is not limited to this type of actuator. For example, the actuator may be of type which drives and operates the operating element by means of an air pressure signal or electric signal. In this case, it is not always necessary that the operating element partially or totally has a magnet, and may be of nonmagnetic type.

As explained above, according to the present invention, it is possible to enhance service conditions and endurance of a damper which damps and stops an operating element of an actuator by reducing a bounce caused when the operating element collides, by shortening time required until the operating element stops, and by reducing damage caused by collision of the operating element.

What is claimed is:

1. A magnetic damper, comprising:

an operating element disposed on an actuator and configured to move by operation of the actuator;

a movable braking plate comprising a magnetic material and configured to contact the operating element at a stroke end; and a stator comprising a permanent magnet or an electromagnet configured to attract the braking plate by a magnetic force, wherein the stator and the braking plate are configured such that a magnetic attraction force acting therebetween is used as a braking force to stop the operating element.

2. The magnetic damper according to claim 1, wherein the braking plate is configured to attract the operating element by a magnetic force.

3. The magnetic damper according to claim 1, further comprising:

a buffering member disposed on an abutment surface of the braking plate with respect to the operating element.

4. The magnetic damper according to claim 2, further comprising:

a buffering member disposed on an abutment surface of the braking plate with respect to the operating element.

5. An actuator, comprising:

a magnetic damper comprising an operating element configured to move with a member taking an output; and a magnetic damper configured to damp and to stop the operating element at a stroke end, wherein the magnetic damper comprises a movable braking plate having a magnetic material and configured to contact the operating element at the stroke end, and a stator having a permanent magnet or an electromagnet configured to attract the braking plate by a magnetic force, and the stator and the braking plate are configured such that a magnetic attraction force acting therebetween is used as a braking force to stop the operating element.

6. The actuator according to claim 5, further comprising:
a buffering member disposed on an abutment surface of the braking plate with respect to the operating element.

7. An actuator, comprising:
a magnetic damper comprising:
cylindrical yokes having a pair of opposed polar teeth,
an exciting coil wound around the yokes,
an operating element having a cylindrical permanent magnet which is axially movably disposed in hollow portions of the yokes and which is provided with north pole and south pole polarized in its radial direction,
an output shaft connected to the operating element, and
a magnetic damper configured to damp and to stop the operating element at a stroke end,
wherein the magnetic damper comprises a movable braking plate configured to receive the operating element, and a stator configured to attract the braking plate by a magnetic force, the yokes are configured to function as the stator, and the yokes and the braking plate are configured such that a magnetic attraction force acting therebetween is used as a braking force to stop the operating element.

8. The actuator according to claim 7, wherein the operating element and braking plate are configured to attract each other by a magnetic force.

9. The actuator according to claim 8, further comprising:
a buffering member disposed on an abutment surface of the braking plate with respect to the operating element.

10. The actuator according to claim 7, further comprising:
a buffering member disposed on an abutment surface of the braking plate with respect to the operating element.

11. The actuator according to claim 7, wherein the braking plate has an annular shape and is disposed on side surfaces of the yokes, and the shaft passes through the braking plate.

12. The actuator according to claim 11, wherein the operating element and the braking plate are configured to attract each other by magnetic force, and a cushioning member is disposed on a surface of the braking plate configured to abut the operating element.

13. An actuator, comprising:
a magnetic damper comprising:
an operating element configured to move together with a member taking an output, and
a magnetic damper configured to damp and to stop the operating element at a stroke end,
wherein the magnetic damper comprises a movable braking plate configured to receive the operating element, and a stator configured to attract the braking plate by a magnetic force,
the stator and the braking plate are configured such that a magnetic attraction force acting therebetween acts as a braking force to stop the operating element, and
the operating element and braking plate are configured to attract each other by a magnetic force.

14. The actuator according to claim 13, further comprising:
a buffering member disposed on an abutment surface of the braking plate with respect to the operating element.

15. A magnetic damper, comprising:
a movable operating element;
a magnetic braking plate configured to contact the operating element at a stroke end; and
a magnetic stator disposed such that a magnetic force between the braking plate and the stator damps a movement of the operating element.

16. The magnetic damper according to claim 15, wherein the stator comprises at least one of a permanent magnet and an electromagnet.

17. The magnetic damper according to claim 16, wherein the operating element is disposed on an actuator and is configured to move with the actuator.

18. The magnetic damper according to claim 17, further comprising:
a buffering member disposed on a surface of the braking plate configured to contact the operating element.

19. The magnetic damper according to claim 15, wherein the operating element is formed of a permanent magnet or an electromagnet.

* * * * *